July 18, 1939.   P. B. PARKS ET AL   2,166,263
TEMPERATURE MODULATING SYSTEM
Filed Sept. 18, 1936
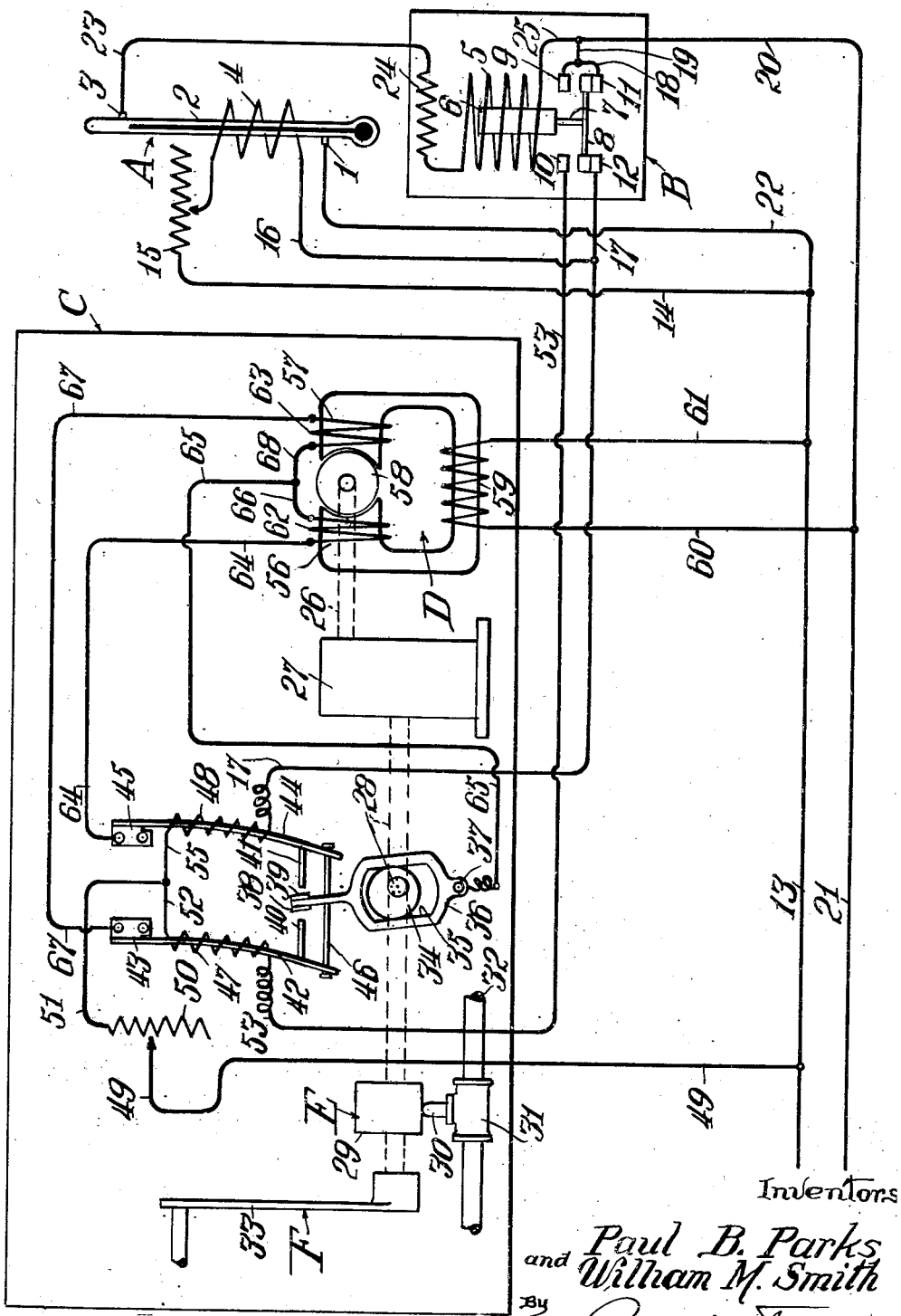
Inventors
Paul B. Parks
and William M. Smith
By
Barnett a Truman
Attorneys Patented July 18, 1939

2,166,263

UNITED STATES PATENT OFFICE 2,166,263

TEMPERATURE MODULATING SYSTEM

Paul B. Parks, Oak Park, and William M. Smith, Chicago, Ill., assignors to Vapor Car Heating Company, Inc., Chicago, Ill., a corporation of New York Application September 18, 1936, Serial No. 101,463

13 Claims. (Cl. 236—68)

This invention relates to certain new and useful improvements in a temperature modulating system, more particularly a system for proportionately adjusting a temperature-regulating mechanism in accordance with the amount of variation of the temperature prevailing within the space whose temperature is being controlled from a certain predetermined desired temperature.

According to this invention the thermostat which determines the temperature to be maintained acts to complete a relay-energizing circuit when this temperature is reached. An electric heating element associated with the thermostat is energized through the relay whenever the relay energizing circuit is broken, that is whenever the temperature falls below the predetermined temperature. Shortly after this additional heat from the heating element is applied to the thermostat it will again function to complete the relay-energizing circuit, whereupon the energizing circuit for the heating element will again be broken. As a consequence, the thermostat will function at short intervals to alternately make and break the relay energizing circuit, and the relay functions in turn to alternately make and break the energizing circuit or circuits for one or more heating elements so as to impart intermittent heating impulses thereto. The duration or length of these heating impulses will vary in proportion to the differential existing between the space temperature at the location of the thermostat and the predetermined desired temperature. These intermittent heating impulses are utilized to proportionately control a motor element by means of which the heat regulating mechanism is properly adjusted to compensate for the differential between the prevailing temperature and the desired temperature.

The principal object of this invention is to provide an improved temperature-modulating system of the type briefly described hereinabove and disclosed more in detail in the specifications which follow.

Another object is to provide an improved thermostatic mechanism adapted to furnish intermittent electric heating impulses of selected lengths or magnitude for adjusting the temperature-regulating mechanism.

Another object is to provide an improved temperature-regulating mechanism comprising a reversible actuating motor, and means for controlling the motor by means of intermittent heat impulses of selected duration.

Other objects and advantages of this invention will be more apparent from the following detailed description of one approved form of apparatus constructed and operating according to the principles of this invention.

The accompanying drawing is a diagrammatic view of the principal elements of the apparatus and a wiring diagram therefor.

The assembly comprises generally the thermostat A; the relay B which cooperates with thermostat A to intermittently furnish electric heating impulses of selected duration; and the temperature regulating mechanism indicated generally at C which is controlled by the intermittent heating impulses.

While the thermostat A might take a variety of forms, it is preferably of the mercury-column type here shown, and may be of the form disclosed and claimed in the patent to Parks and Miller, 2,046,578, granted July 7, 1936. The thermostat is provided with two spaced apart electric contacts, the lower contact 1 being in constant engagement with the mercury column 2, while the upper contact 3 is only engaged by the mercury column when the instrument responds to some predetermined maximum temperature. When this maximum temperature is reached an electric circuit will be completed through the mercury column, and when the temperature falls below this predetermined maximum the electric circuit will be broken. A heating coil 4 or other equivalent heating element is associated with the thermostat so as to add a predetermined amount of additional heat thereto when the coil is energized. In this manner the circuit will be completed through the thermostat even though the prevailing temperature is lower than the temperature at which the thermostat is designed to function.

The relay B comprises a magnetic coil 5 which when energized will draw up core 6 which through stem 7 lifts movable contact plate 8 into engagement with a pair of fixed contacts 9 and 10. When the magnetic coil is deenergized contact 8 will drop into engagement with a second pair of fixed contacts 11 and 12.

Assuming now that the temperature prevailing at the location of thermostat A is below the predetermined temperature at which the thermostat is desired to function, the relay B will be deenergized. At such times an energizing circuit for the heating element 4 will be completed as follows: From one power main 13 through wire 14, adjustable resistance 15, heating element 4, wires 16 and 17, relay contacts 12, 8 and 11, and wires 18, 19 and 20 to the other power main 21. The additional heat imparted by heating element 4 will cause the mercury column to rise even though the temperature at the location of the thermostat is below the desired temperature, and when the mercury column engages the upper fixed contact 3 an energizing circuit for the relay will be completed as follows: From power main 13 through wire 22, contact 1, mercury column 2, contact 3, wire 23, resistance 24, relay coil 5, and wires 25 and 20 to the other power main 21. This will lift the movable relay contact 8 into engagement with the upper pair of fixed contacts 9 and 10 and will break the energizing circuit for heating element 4. Since the additional heat is no longer being imparted to the thermostat, and the temperature prevailing at the thermostat is not high enough to hold the mercury column in engagement with the upper contact 3, the mercury column will soon fall so as to break the relay-energizing circuit and permit the movable contact 8 to again fall into engagement with the fixed contacts 11 and 12 and thus again complete the energizing circuit for heating element 4. As a consequence the relay will be intermittently energized and deenergized, the rapidity of the relay movements depending upon the magnitude of the differential between the temperature prevailing at the location of thermostat A and the predetermined temperature at which the thermostat is designed to function. These intermittent movements of the relay serve to make and break other electric-heater energizing circuits so as to selectively send out heating impulses of selected lengths or duration as will be hereinafter described. These heating impulses are used to proportionately control the temperature-regulating mechanism C.

The temperature-regulating mechanism C, as here shown, comprises the reversible electric motor D which, through motor shaft 26, reduction gearing 27, and driven shaft 28, operates the temperature adjusting devices indicated at E and F. The mechanism E comprises a cam 29 mounted on shaft 28 and adapted by its rotation to adjust the vertical position of the operating plunger 30 of valve 31 in a pipe line 32, thus controlling the rate of flow of heating or cooling medium through the pipe 32. The mechanism F comprises a lever 33 mounted on shaft 28 and adapted to adjust the position of a damper or similar mechanism. It will be understood that either or both of the mechanisms E and F can be used, or any equivalent device adapted to adjust a heating or cooling mechanism by which the temperature of the space to be controlled is regulated.

On driven shaft 28 is mounted a cam 34 which rotates in opening 35 in switch-lever 36 pivoted at 37. The upper free end of this lever carries a pair of contacts 38 and 39 adapted to engage respectively with the opposed contacts 40 and 41. Contact 40 is carried by the movable end portion of a thermostatic bar 42 anchored at its upper end 43. Contact 41 is carried by a similar thermostatic bar 44 anchored at its upper end 45. The movable ends of the two thermostatic bars 42 and 44 are connected by rod 46, and the two thermostatic bars are opposed to one another or act in opposite directions in response to temperature changes. In this way the effect of atmospheric temperature changes in the vicinity of this mechanism is neutralized.

A pair of similar electric heating elements 47 and 48 surround or are otherwise associated with the respective thermostatic bars 42 and 44.

When relay B is energized an energizing circuit for heater 47 will be completed as follows: from power main 13 through wire 49, adjustable resistance 50, wire 51, wire 52, heating element 47, wire 53, relay contacts 10, 8 and 9, and wires 19 and 20, to the other power main 21. The heat imparted by this heating element 47 to the thermostatic bar 42 will cause this bar to warp in one direction so as to move one of the switch contacts 40 or 41 (for example the contact 40) into engagement with contact 38 carried by lever 36. On the other hand, if heating element 48 is energized, the thermostatic bar 44 will be warped in the opposite direction so as to bring, for example, contact 41 into engagement with contact 39. Heating element 48 will be energized when the relay B is deenergized, through the following circuit: from power main 13 through wire 49, adjustable resistance 50, wires 51 and 55, heating element 48, wire 17, relay contacts 12, 8 and 11, and wires 18, 19 and 20 to the other power main 21. It will thus be seen that every time the relay B is energized the pair of contacts 40 and 41 will tend to swing in one direction, and when the relay is deenergized these contacts will tend to swing in the opposite direction.

The motor D may be of a well known shaded-pole type and comprises the pole pieces 56 and 57 between which the armature 58 rotates, and the field 59 which is constantly energized from the power mains through wires 60 and 61. Shading coil 62 is associated with pole piece 56, and a similar shading coil 63 is associated with pole piece 57. When one of these shading coils is short-circuited the motor will rotate in one direction, and when the other shading coil is short-circuited the motor will rotate in the opposite direction. When neither coil is short-circuited the motor armature 58 will remain stationary. When switch contacts 39 and 41 are in engagement, the shading coil 62 will be short-circuited through the following circuit: From one terminal of the coil through wire 64, thermostatic bar 44, contacts 41 and 39, lever 36, and wires 65 and 66 to the other terminal of the coil. Similarly, when contacts 40 and 38 are in engagement the other shading coil 63 will be short-circuited through the following circuit: from one terminal of this coil through wire 67, thermostatic bar 42, contacts 40 and 38, lever 36, and wires 65 and 68 to the other terminal of this coil.

It may here be noted that the motor D and the switch assembly operated by cam 34 are illustrated at right angles to their true positions on the shafts 26 and 28 for convenience of illustration.

Referring now to the general operation of this assembly, and assuming that the apparatus is used to control a heating system, if the prevailing temperature in the space is considerably below the desired temperature, the relay B will be deenergized and the heater 4 will be energized for the greater portion of the time, that is it is necessary to almost constantly apply heat by means of heater 4 in order to keep the mercury column in engagement with the upper fixed contact 3 of the thermostat. Under such conditions the intermittent heat impulses applied to heater 48 will be of relatively long duration, whereas the alternate heat impulses applied to heater 47 will be relatively short. As a consequence, the contacts 40 and 41 will be swung in one direction (for example toward the left), so as to bring contacts 41 and 39 into engagement. This will cause motor D to rotate in such a direction as to adjust the mechanisms E or F to admit more heat to the space. At the same time, the cam 34 will be rotated in such a direction as to move contact 39 out of engagement with contact 41 and stop the motor. The position of adjustment of shaft 28 at which the motor will be stopped will depend, of course, upon the distance to which contact 41 has been swung toward the left which in turn will depend upon the preponderance of heat applied by heater 48 as compared with heater 47, this in turn depending upon the relative length of the heat impulses supplied from the thermostatic assembly A and relay B.

On the other hand, when the desired temperature has been established in the space to be heated, the mercury column will remain for the greater portion of the time in engagement with fixed contact 3 so that relay B will be energized for the greater portion of the time and the longer heat impulses will be applied to heater 47, thus tending to shift the contacts 40 and 41 in the opposite direction or toward the right. This will cause the motor D to rotate in the opposite direction to such a position as to adjust the mechanisms E or F to cut off the heat supply. It will be understood that the mechanism will ultimately assume a position of substantial balance so that the heat supplied will be just sufficient to maintain the desired temperature in the space being heated.

It will be understood that by properly adjusting the resistances 15 and 50, the heat supplied to the thermostatic elements by heaters 4, 47 and 48 may be varied so as to adjust the sensitivity of the apparatus and the temperatures to be maintained within certain limits.

The electrical system, as here shown by way of example, is adapted for use with alternating current. If direct current were used, another well-known type of reversible motor would be substituted at D, and some changes would be required in the circuits controlled by the heat-impulse actuated switch mechanism, but we believe that such changes are obvious to one skilled in this art and need not be here specifically described or illustrated. No changes would be necessary in the thermostatic control assembly shown at A and B.

While this system has been herein disclosed, by way of example, as applied to a heating system for use when the prevailing outside temperature is lower than the temperature desired within the space, the broader principles of this novel method of modulated temperature control could be applied in an analogous manner to the control of a cooling or refrigerating system. In such a system the predetermined temperature at which the thermostat completes the relay-energizing circuit would be the maximum temperature permitted in the space, and the cooling system might be employed to its maximum capacity when this temperature is reached within the space. At lower temperatures, the cooling effect would be lowered or modulated so as to be just sufficient to remove the heat entering the space.

With some types of temperature regulating mechanisms, for example the system disclosed and claimed in our copending application Serial No. 101,464, filed of even date herewith, a single series of intermittent heat impulses are sufficient to effect the control. In such a system it will be understood that one of the heating elements 47 or 48 and the energizing circuit therefor will be omitted. Otherwise the cycle of operations will be similar to that hereinabove described.

We claim:

1. In a temperature controlling system, in combination, a thermostatic assembly comprising a thermostat responsive to changes in the temperature prevailing at a certain locality, a pair of heating circuits, and means cooperating with the thermostat for intermittently and alternately closing the heating circuits as the prevailing temperature rises above or falls below a predetermined temperature, the duration of the intermittent heating impulses being determined in proportion to the variation of the prevailing temperature from the predetermined temperature, and a temperature regulating mechanism comprising a rotary driven shaft, a reversible motor for rotating the shaft, a pair of control circuits for alternatively actuating the motor in either direction, a switch mechanism for alternatively closing the control circuits comprising a pair of heating elements, one in each of the heating circuits, and means actuated by rotation of the shaft for opening the switch.

2. In a temperature controlling system, in combination, a thermostatic assembly comprising a thermostat responsive to changes in the temperature prevailing at a certain locality, a pair of heating circuits, and means cooperating with the thermostat for intermittently and alternately closing the heating circuits as the prevailing temperature rises above or falls below a predetermined temperature, the duration of the intermittent heating impulses being determined in proportion to the variation of the prevailing temperature from the predetermined temperature, and a temperature regulating mechanism comprising a rotary driven shaft, a reversible motor for rotating the shaft, a pair of control circuits each including a shading coil on the motor for causing the motor to be actuated in one or the other direction as one or the other of the shading coils is short-circuited, a switch mechanism to alternatively close the control circuits, said switch-mechanism comprising a pair of opposed thermostatic members, a pair of heating elements, one in each heating circuit and each associated with one of the thermostatic members so that heating impulses imparted to one of these elements will cause the switch to close a selected one of the control circuits, and means actuated by rotation of the rotary shaft to open the last closed switch.

3. In a temperature controlling system, in combination, a mercury-column thermostat responsive to temperature changes at a certain location, a circuit adapted to be completed or broken through the mercury column of said thermostat as the temperature rises to or falls below a predetermined maximum, a heating element positioned adjacent the thermostat and adapted to impart additional heat thereto, an energizing circuit for the heating element, circuit-controlling means for closing the energizing circuit when the first-mentioned circuit is broken and vice-versa, and a temperature regulating mechanism adjusted by said circuit-controlling means.

4. In a temperature controlling system, in combination, a mercury-column thermostat responsive to temperature changes at a certain location, a circuit adapted to be completed or broken through the mercury column of said thermostat as the temperature rises to or falls below a predetermined maximum, a heating element positioned adjacent the thermostat and adapted to impart additional heat thereto, an energizing circuit for the heating element, circuit-controlling means for closing the energizing circuit when the first-mentioned circuit is broken and vice versa, and a temperature regulating mechanism comprising a heating element, and an energizing circuit therefor, said last-mentioned circuit also being made and broken by the movements of the circuit-controlling means.

5. In a temperature controlling system, in combination, a mercury-column thermostat responsive to temperature changes at a certain location, a circuit adapted to be completed or broken through the mercury column of said thermostat as the temperature rises to or falls below a predetermined maximum, a heating element positioned adjacent the thermostat and adapted to impart additional heat thereto, an energizing circuit for the heating element, circuit-controlling means for closing the energizing circuit when the first-mentioned circuit is broken and vice-versa, and a temperature regulating mechanism comprising a pair of heating elements, and separate energizing circuits for the latter heating elements, the circuit-controlling means also functioning to alternately open and close these latter energizing circuits to impart heating impulses of selected duration to the last mentioned heating elements.

6. In a temperature controlling system, in combination, a relay, an energizing circuit therefor, a mercury-column thermostat responsive to temperature changes at a certain location and adapted to close the relay-energizing circuit at a predetermined maximum temperature, a heating element positioned adjacent the thermostat and adapted to impart additional heat thereto, an energizing circuit for the heating element, said latter circuit being closed by the relay when the relay is deenergized, and a temperature regulating mechanism also adjusted by the movements of the relay.

7. In a temperature controlling system, in combination, a relay, an energizing circuit therefor, a mercury-column thermostat responsive to temperature changes at a certain location and adapted to close the relay-energizing circuit at a predetermined maximum temperature, a heating element positioned adjacent the thermostat and adapted to impart additional heat thereto, an energizing circuit for the heating element, said latter circuit being closed by the relay when the relay is deenergized, and a temperature regulating mechanism comprising a heating element, an energizing circuit therefor, and switch-mechanism in said latter circuit and actuated by the movements of the relay to impart a series of intermittent heating impulses to the last-mentioned heating element.

8. In a temperature controlling system, in combination, a relay, an energizing circuit therefor, a mercury-column thermostat responsive to temperature changes at a certain location and adapted to close the relay-energizing circuit at a predetermined maximum temperature, a heating element positioned adjacent the thermostat and adapted to impart additional heat thereto, an energizing circuit for the heating element, said latter circuit being closed by the relay when the relay is deenergized, and a temperature regulating mechanism comprising a pair of heating elements, separate energizing circuits for the latter heating elements, and switch mechanism actuated by the relay to intermittently and alternately impart heating impulses to the last-mentioned heating elements as the relay is energized or deenergized.

9. In a temperature controlling system, in combination, a relay, an energizing circuit therefor, a mercury-column thermostat responsive to temperature changes at a certain locality and adapted to close the relay-energizing circuit at a predetermined maximum temperature, a heating element positioned adjacent the thermostat and adapted to impart additional heat thereto, an energizing circuit for the heating element, a pair of heating circuits, switch mechanism actuated by the relay for closing the first-mentioned heater energizing circuit and one of the pair of heating circuits when the relay is deenergized, and for closing the other heating circuit of the pair when the relay is energized, and a temperature regulating mechanism comprising heating elements in the pair of heating circuits.

10. In a temperature controlling system, in combination, a relay, an energizing circuit therefor, a mercury-column thermostat responsive to temperature changes at a certain locality and adapted to close the relay-energizing circuit at a predetermined maximum temperature, a heating element positioned adjacent the thermostat and adapted to impart additional heat thereto, an energizing circuit for the heating element, a pair of heating circuits, switch mechanism actuated by the relay for closing the first-mentioned heater energizing circuit and one of the pair of heating circuits when the relay is deenergized, and for closing the other heating circuit of the pair when the relay is energized, and a temperature regulating mechanism comprising a rotary driven shaft, a reversible motor for driving the shaft, a pair of control circuits for the motor for alternatively actuating the motor in either direction, a switch mechanism for alternatively closing the control circuits, said switch mechanism comprising a pair of heating elements one in each of the pair of heating circuits, and means actuated by rotation of the shaft for opening the switch.

11. In a temperature controlling system, in combination, a relay, an energizing circuit therefor, a mercury-column thermostat responsive to temperature changes at a certain locality and adapted to close the relay-energizing circuit at a predetermined maximum temperature, a heating element positioned adjacent the thermostat and adapted to impart additional heat thereto, an energizing circuit for the heating element, a pair of heating circuits, switch mechanism actuated by the relay for closing the first-mentioned heater energizing circuit and one of the pair of heating circuits when the relay is deenergized, and for closing the other heating circuit of the pair when the relay is energized, and a temperature regulating mechanism comprising a rotary driven shaft, a reversible motor for driving the shaft, a pair of control circuits for the motor for alternatively actuating the motor in either direction, a switch mechanism for alternatively closing the control circuits, said switch mechanism comprising a pair of opposed thermostatic members, a pair of heating elements one in each of the pair of heating circuits and each associated with one of the thermostatic members so that heating impulses imparted to one of these elements will cause the switch to close one of the control circuits, and means actuated by rotation of the shaft to open the last closed switch.

12. In a temperature controlling system, in combination, a relay, an energizing circuit therefor, a mercury-column thermostat responsive to temperature changes at a certain locality and adapted to close the relay-energizing circuit at a predetermined maximum temperature, a heating element positioned adjacent the thermostat and adapted to impart additional heat thereto, an energizing circuit for the heating element, a pair of heating circuits, switch mechanism actuated by the relay for closing the first-mentioned heater energizing circuit and one of the pair of heating circuits when the relay is deenergized, and for closing the other heating circuit of the pair when the relay is energized, and a temperature regulating mechanism comprising a rotary driven shaft, a reversible motor for driving the shaft, a pair of control circuits each including a shading coil on the motor for causing the motor to be actuated in one direction or the other as one or the other of the shading coils is short-circuited, a switch mechanism to alternatively close the control circuits, said switch-mechanism comprising a pair of heating elements one in each of the pair of heating circuits, and means actuated by rotation of the shaft to open the last closed switch.

13. In a temperature controlling system, in combination, a relay, an energizing circuit therefor, a mercury-column thermostat responsive to temperature changes at a certain locality and adapted to close the relay-energizing circuit at a predetermined maximum temperature, a heating element positioned adjacent the thermostat and adapted to impart additional heat thereto, an energizing circuit for the heating element, a pair of heating circuits, switch mechanism actuated by the relay for closing the first-mentioned heater energizing circuit and one of the pair of heating circuits when the relay is deenergized, and for closing the other heating circuit of the pair when the relay is energized, and a temperature regulating mechanism comprising a rotary driven shaft, a reversible motor for driving the shaft, a pair of control circuits each including a shading coil on the motor for causing the motor to be actuated in one direction or the other as one or the other of the shading coils is short-circuited, a switch mechanism to alternatively close the control circuits, said switch-mechanism including a pair of opposed thermostatic members, a pair of heating elements one in each of the pair of heating circuits and each associated with one of the pair of thermostatic members so that heating impulses imparted to one of these elements will cause the switch to close a selected one of the control circuits, and means actuated by rotation of the rotary shaft to open the last closed switch.

PAUL B. PARKS.
WILLIAM M. SMITH.